Oct. 21, 1958     G. A. LYON     2,857,025
WHEEL STRUCTURE
Original Filed May 31, 1952
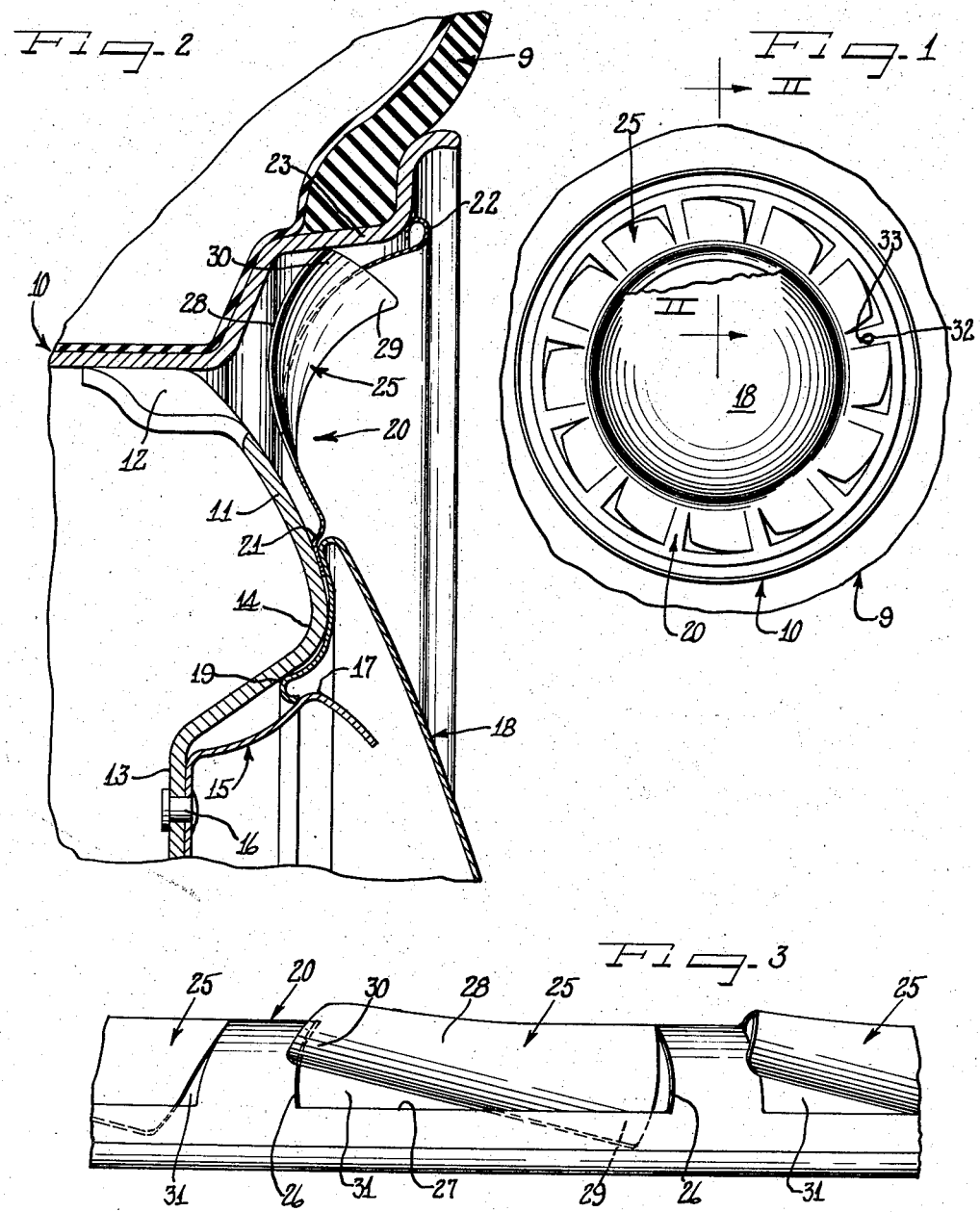
Inventor
George Albert Lyon United States Patent Office 2,857,025
Patented Oct. 21, 1958

2,857,025

WHEEL STRUCTURE

George Albert Lyon, Detroit, Mich.

Continuation of abandoned application Serial No. 290,997, May 31, 1952. This application September 25, 1956, Serial No. 612,028

17 Claims. (Cl. 188—264)

This application is a continuation of my application Serial No. 290,997 filed May 31, 1952, now abandoned.

This invention relates to a wheel structure and more particularly to an automobile wheel cover wherein the cover retaining elements are also formed into air scoops.

An object of this invention is to provide in an automobile wheel cover, cover retaining elements which serve the dual function of holding the cover on the wheel and also of scooping up air in the rotation of the cover with the wheel.

Another object of the invention is to provide a wheel cover with a series of air scoops radially inward of the outer edge of the cover and each of which also serves as a cover retaining means for engagement with the wheel.

Still another object of the invention is to provide a wheel cover which is adapted to be applied to the outer side of a wheel in snap-on, pry-off relation and which has peripheral portions adapted to be in resilient engagement with rim portions of the wheel assembly so as to aid in cushioning any shocks which otherwise would be transmitted from the rim directly to the body of the wheel cover and to allow for tolerances between the cover and wheel assembly, said peripheral portions further being constructed and arranged to prevent relative rotation of the cover with respect to the rim, in at least one direction.

It is still another object of this invention to provide a wheel cover in combination with a wheel assembly in which the wheel has means at the hub portion thereof to which the cover can be attached removably, and which cover has resilient means provided between the rim and main body of the cover to cushion shocks that might otherwise cause the cover to be sprung from the wheel.

Yet another object of this invention is to provide a wheel cover with both cover retaining means and air scoops and which lends itself to economical manufacture on a large production scale.

In accordance with the general features of this invention there is provided for use in a wheel structure, a circular wheel cover having a series of spaced annularly arranged openings radially inward from the outer edge of the cover and air scoops integral with said cover at said openings, each of which scoops is transversely curved and formed in a circumferential direction at one end with an axially outer scoop portion and at its other end with a cover retaining edge for engagement with the wheel.

Still another feature of the invention relates to providing said openings in the cover by deflecting from the cover spaced sections which are formed into said air scoops and cover retaining means.

Yet another feature of the invention relates to providing a circular ornamental disk wheel cover having a first annular portion for engagement with cover retaining means on the wheel, and a second annular portion located radially outwardly from the first named annular portion for generally telescoping relation to an axial flange of the wheel rim, said second named annular portion having a plurality of radially outwardly pressed resilient tabs spaced around its periphery and extending in a generally non-radial direction for resilient engagement with said axial flange of the rim.

Other objects and features of this invention will more fully appear from the following detailed description taken in connection with the accompanying drawing which illustrates a single embodiment thereof and in which:

Figure 1 is a fragmentary side view of a wheel structure having a cover of my invention;

Figure 2 is an enlarged fragmentary cross-sectional view taken on substantially the line II—II of Figure 1 looking in the direction indicated by the arows; and Figure 3 is a fragmentary end view of a portion of my cover showing how the scoop and retaining elements extend from the body of the cover.

As shown on the drawings:

My invention is applicable to a conventional automobile wheel such as one including a pneumatic tire and tube assembly 9 supported in the usual way upon a multi-flange drop center type tire rim 10 which is in turn carried by a dished metallic body part 11. The tire rim and body parts 10 and 11 are secured together at spaced intervals in a manner well known to those familiar with this art, and the points of attachment alternate with transverse wheel openings 12 through which air can flow to assist in cooling the wheel and especially the brake drum (not shown).

The center part of the dished wheel body part 11 has a depressed bolt-on flange 13 adapted to be fastened or bolted by any suitable means (not shown) to a flange on an axle of an automobile wheel. The flange 13 is encompassed by a generally axially outwardly projecting nose bulge portion 14 and has secured to it a series of annularly arranged hub cap retaining spring clips 15 which may be of any suitable number such, for example, three to five as is well known in the art. These spring clips are disposed radially inward of the bulged nose portion 14 of the wheel body part 11. Each of the clips 15 includes an end fastened at 16 to the bolt-on flange 13 and a humped resilient end 17 for retaining cooperation with a central hub cap designated generally by the reference character 18.

The hub cap 18 has an underturned skirt or flange portion 19 curved to nest snugly over the wheel nose portion 14 and arranged for detachable snap-on retained engagement by the ends 17 of the spring clips 15. My invention is not specifically concerned with the hub cap or its retention on the wheel, but rather with a wheel cover designated generally by the reference character 20 and for which the hub cap provides cover retaining means on the wheel. As a matter of fact, the wheel cover 20, while shown in the form of an annulus, could equally well be in the form of a complete disc in which event the central hub cap 18 could be dispensed with. The hub cap 18 is only necessary if the center of the wheel cover 20 has a hole in it so as to cover up the hole and conceal the center part of the wheel body.

In the illustrated embodiment of the cover 20 it is shown in the form of a circular ornamental dished sheet metal disk stamping made from any suitable relatively resilient sheet steel stock. This cover 20 has an innerturned first annular generally axially inwardly extending portion 21 terminating in a generally radially inwardly extending edge portion or flange adapted to underlie the turned outer edge of the hub cap 18 and thereby to be clamped in place against the wheel body nose bulge portion 14. It also has a radially outer turned or beaded edge 22 adapted to seat against the edge of an inclined flange 23 of the tire rim 10. This beaded edge, as will become more apparent hereinafter, serves to reinforce the cover at points of weakness due to the provision of apertures or openings in the cover, and is located at the outer terminus of a second annular portion of the cover located radially outwardly from or with respect to the first named annular portion 21 and comprising the radially outer annular portion of the cover disk which extends generally axially inwardly from the terminal portion 22 of the disk generally telescopically with respect to the axial flange 23 of the tire rim.

Formed integral with and arranged annularly of the dished cover 20 are a circumferential series of spaced pressed out resilient tabs or scoops and cover retaining and cushioning and turn-preventing elements 25 which are all identical in construction and hence a description of one will suffice for all. Each scoop tab 25 is formed by transverse spaced end cuts 26—26 (Fig. 3) and by a longitudinal cut 27 in the main body of the cover 20 and more particularly in the second annular generally axially extending radially outer portion of the cover disk.

Each scoop element 25 is pressed from and deflected from and relative to the body of the cover 20 and is transversely curved at 28, as shown in Figures 2 and 3, in the direction of its width and is inclined longitudinally to extend in non-radial direction or, in other words, circumferentially of the cover. One end of each scoop element is deflected axially outwardly into a scoop portion 29 inside of the dished cover but so positioned as to scoop up air in the rotation of the cover. The other end 30 of each scoop element is deflected axially rearwardly and generally radially outwardly relative to the end cut 27, as shown in Figures 2 and 3, thereby projecting radially outwardly beyond the axially extending outer annular portion of the cover across the gap between the outer portion of the cover and the axial rim flange 23, for cover retaining cooperation with the wheel and more specifically for detachable gripping engagement with the tire rim flange 23. For this purpose, it will be observed that the end portions 29 and 30 are directed in addition to their generally tilted or twisted relationship to the cover member, in a generally axially outward direction toward the tip portions thereof adjacent the respective cuts 27.

In view of the transversely curved configuration imparted to scoop element 25 it will be appreciated that the scoop element 25 is channeled by virtue of the curved cross-section imparted to it as a consequence of it being struck out from and formed as an integral part of the dished cover 20. As is apparent in Figure 2, it will be appreciated, that dished cover 20 includes an annular portion of generally curved concave-convex cross-section.

By reason of the fact that each of the scoop elements 25 is formed integral with and from the body of the cover 20, an opening 31 is left in the body of the cover as best shown in Figure 3. Since a series of these openings 31 are employed and inasmuch as they are generally axially aligned with the wheel openings 12, air scooped up by the scoop elements 25 in the rotation of the wheel will flow through the opening 31 and into the wheel opening 12, or will be aspirated if the cover is rotated in the opposite direction for drawing air outwardly through the wheel openings, in either instance for assisting in the cooling of the wheel.

I also contemplate providing a valve stem opening 32 in the cover 20 (Fig. 1) through which the usual valve stem 33, extending from the tire rim 10, may extend so as to be accessible from the exterior of the cover. In addition such valve stem will assist in resisting creepage or turning of the cover 20 on the wheel.

In addition to their air motivating or air vane function, the scoops or tabs 25 by virtue of their resilient structure provide a resilient joint between the cover 20 and the rim 10. Thus, these tabs will cushion any shocks that may be transmitted from the rim toward the cover, thereby serving to prevent springing of the cover from the wheel under even severe driving conditions. In addition, the tabs or scoops 25 are effective for taking up tolerances which may exist between the wheel assembly and the cover. Also, since the tabs 25 extend generally in an axially outward direction, they serve as an effective pilot for guiding the cover when being pressed onto the wheel assembly. It should also be noted that by virtue of the twisted structure of the tabs 25 and the biting engagement thereof with the intermediate flange 23, rotation of the cover 20 with respect to the rim 10 is prevented, at least in one direction.

In the application of the cover to the wheel the valve stem hole 32 is first aligned with the valve stem 33 and then the cover is pressed axially into the wheel thereby causing the ends or edges 30 of the scoop elements 25 to slide along tire rim flange 23 and to be resiliently cammed or deflected into tight cover retaining engagement therewith. Axial inward movement of the cover is limited by the outer beaded edge 22 of the cover bottoming against the edge of the flange 23. In this regard it should be noted that this beaded edge 22 serves to reinforce the cover adjacent the annularly arranged openings 31 left in the cover in the forming of the scoop elements 25.

After the cover has been thus placed on the wheel, the hub cap 18 can be placed over the center of the wheel and snapped into retained engagement with the spring clips 15. Inasmuch as the outer edge of the hub cap 18 engages the interturned edge 21 of the cover 20, it will also assist in the retention of the cover on the wheel.

When it is desired to remove the cover 20, the hub cap 18 is first pried off of the wheel and thereafter a screwdriver or the like can be employed to progressively loosen the scoops from retaining engagement with tire rim flange 23 until a sufficient number of the scoops is disengaged so that the cover 20 can be lifted from the wheel. In this connection, it may be noted that by virtue of the axially inward extending annular inner portion 21 not only is the inner margin of the cover 20 reinforced, but a pry-off shoulder is provided that facilitates application of pry-off leverage to the adjacent margin of the hub cap.

I claim as my invention:

1. As an article of manufacture, a circular wheel cover having a series of spaced annularly arranged openings radially inward from the outer edge of the cover and air scoops integral with and deflected from said cover at and leaving said openings, each of said scoops being transversely curved and inclined in a circumferential direction with an axially outer scoop portion and a trailing end portion behind said cover for resilient cover retaining engagement with the wheel, said cover also comprising an annular dished portion in which said openings and scoops are formed, the scoop portion of each scoop extending into the hollow of the dished portion and the trailing end portion of the scoop extending to the under side of the dished portion.

2. In a wheel assembly including flanged tire rim and body parts with spaced wheel openings adjacent the junction of said parts, a circular wheel cover including an annular part extending into the wheel and over the junction of said wheel parts, said annular part having spaced annularly arranged openings radially inward from an outer edge of said annular part, and air scoops integral with and deflected from said annular part at and leaving said openings, each of said scoops being transversely curved and each scoop having one end deflected outwardly from the annular cover part for scooping up air and another end deflected rearwardly from said cover part for resilient cover retaining engagement with one of said wheel parts.

3. In a wheel assembly including flanged tire rim and body parts with spaced wheel openings adjacent the junction of said parts, a circular wheel cover including an annular part extending into the wheel and over the junction of said wheel parts, said annular part having spaced annularly arranged openings radially inward from an outer edge of said annular part, and air scoops integral with and deflected from said annular part at and leaving said openings, each of said scoops being transversely curved and each scoop having one end deflected outwardly from the annular cover part for scooping up air and another end deflected rearwardly from said cover part for resilient cover retaining engagement with a flange of the tire rim part.

4. In a wheel assembly including flanged tire rim and body parts with spaced wheel openings adjacent the junction of said parts, a circular wheel cover including an annular part extending into the wheel and over the junction of said wheel parts, said annular part having spaced annularly arranged openings radially inward from an outer edge of said annular part, and air scoops integral with and deflected from said annular part at and leaving said openings, each of said scoops being transversely curved and each scoop having one end deflected outwardly from the annular cover part for scooping up air and another end deflected rearwardly from said cover part for resilient cover retaining engagement with one of said wheel parts, said openings in said annular cover part being generally aligned with said wheel openings so that the outer ends of said scoops can scoop up and direct air through the openings into the cover part and into said wheel openings.

5. In a wheel assembly including flanged tire rim and body parts with spaced wheel openings adjacent the junction of said parts and with the body part having retaining means thereon, an outer cover member including an annular part extending generally into the wheel and over the junction of said wheel parts, said annular part having spaced annularly arranged openings radially inward from an outer edge of said annular part, air scoops integral with and deflected from said annular part at and leaving said openings, each of said scoops being transversely curved and each scoop having one end deflected outwardly from the annular cover part for scooping up air and another end deflected rearwardly from said cover part for resilient cover retaining engagement with one of said wheel parts, said outer cover member having a seat radially inward of said scoops, and an inner cover member having a portion engageable in said seat with the inner cover member being capable of retained engagement with said retaining means whereby the retaining action between said inner cover member and retaining means augments the tensioned engagement of the scoops upon the wheel part.

6. In a wheel assembly including flanged tire rim and body parts with spaced wheel openings adjacent the junction of said parts and with the body part having retaining means thereon, an outer cover member including an annular part extending generally into the wheel and over the junction of said wheel parts, said annular part having spaced annularly arranged openings radially inward from an outer edge of said annular part, air scoops integral with and deflected from said annular part at and leaving said openings, each of said scoops being transversely curved and each scoop having one end deflected outwardly from the annular cover part for scooping up air and another end deflected rearwardly from said cover part for resilient cover retaining engagement with one of said wheel parts, and an inner cover member having a portion in engagement with said outer cover member, said inner cover member being engageable with said retaining means in snap-on, pry-off engagement therewith whereby the retaining action between the aforesaid serves to supplement the retaining engagement of said scoops with one of said wheel parts.

7. In a wheel assembly including flanged tire rim and body parts with spaced wheel openings adjacent the junction of said parts and with the body part having retaining means thereon, an outer cover member including an annular part extending generally into the wheel and over the junction of said wheel parts, said annular part having spaced annularly arranged openings radially inward from an outer edge of said annular part, air scoops integral with and deflected from said annular part at and leaving said openings, each of said scoops being transversely curved and each scoop having one end deflected outwardly from the annular cover part for scooping up air and another end deflected rearwardly from said cover part for resilient cover retaining engagement with one of said wheel parts, said outer cover member having an annular seat spaced radially inwardly of said scoop ends, and an inner cover having an annular portion in said seat to bottom same upon the wheel when said inner cover member is retainingly engaged with said retaining means.

8. In a wheel assembly including flanged tire rim and body parts with spaced wheel openings adjacent the junction of said parts, a circular wheel cover including an annular part extending into the wheel and over the junction of said wheel parts, said annular part having spaced annularly arranged openings radially inward from an outer edge of said annular part, and air scoops integral with and deflected from said annular part at and leaving said openings, each of said scoops being transversely curved and each scoop having one end deflected outwardly from the annular cover part for scooping up air and another end deflected rearwardly from said cover part for resilient cover retaining engagement with one of said wheel parts, said edge being an annular bead and bottomed upon one of said parts to provide a cushioning stop thereby precluding axial inward disposition of the cover.

9. In a wheel structure including rim and body parts having spaced openings adjacent the junction of the parts, a circular wheel trim for disposition over the wheel having an annular portion of generally curved concave-convex cross-section and having radially spaced areas partially cut free of and partially deflected out of the curved plane of said annular portion, each of said deflected areas comprising an air scoop which is channeled by virtue of the curved cross-section imparted to it as a consequence of it being an integral part of said curved annular portion, each of said scoops being integral at its generally radially inner end with the annular portion and free at its generally radially outer end, with the radially outer end resiliently engageable with the wheel to retain the cover upon the wheel.

10. In a wheel structure including rim and body parts having spaced openings adjacent the junction of the parts, a circular wheel trim for disposition over the wheel having an annular portion of generally curved concave-convex cross-section and having radially spaced areas partially cut free of and partially deflected out of the curved plane of said annular portion, each of said deflected areas comprising an air scoop which is channeled by virtue of the curved cross-section imparted to it as a consequence of it being an integral part of said curved annular portion, each of said scoops being integral at its generally radially inner end with the annular portion and free at its generally radially outer end with the radially outer end resiliently engageable with the wheel to retain the cover upon the wheel, said annular portion having openings each in communication with one of said channeled air scoops to circulate air therethrough into said wheel openings.

11. In a wheel assembly including a wheel, a circular wheel cover for detachable engagement with the wheel, said cover having a series of spaced annularly arranged openings radially inward from a continuous circular outer edge of the cover and air scoops integral with said edge and deflected from said cover at and leaving said openings radially inward of said edge, each of said scoops being transversely curved and inclined in a circumferential direction with an axially outer scooping portion and a trailing end portion behind said cover edge in resilient cover retaining engagement with the wheel.

12. In a wheel assembly including a tire rim having wheel openings adjacent thereto, a circular wheel cover including a dished body having a plurality of annularly arranged cover retaining elements extending from a portion of the cover overlying said rim radially inward of its outer edge, said edge being substantially continuous and each of said elements having a channeled portion thereof formed axially outwardly of the cover into an air scoop for scooping up air in the use of the cover on the wheel, said elements comprising portions extending from the cover body adjacent openings in the cover radially inward of said continuous edge and through which the scooped-up air can flow transversely through the cover into the wheel openings.

13. A wheel cover for disposition over a wheel and inwardly of the wheel rim, comprising a circular ornamental disk portion adapted to conceal the wheel and inner parts of the rim and having a first annular radially inner portion for engagement with the wheel and a second annular portion located radially outwardly from the first named annular portion and extending generally axially inwardly for telescoping relation to an axial flange of said rim, the second named annular portion having pressed therefrom a plurality of radially outwardly projecting resilient tabs spaced around its periphery and with the ends thereof extending in a generally axially outward direction for resilient engagement with said axial flange of the rim.

14. A wheel cover for disposition over a wheel and inwardly of the wheel rim, comprising a circular ornamental member having a first annular radially inner portion for engagement with cover retaining means on the wheel, a second annular portion located radially outwardly from the first named annular portion and extending generally axially inwardly for disposition in generally opposing relation to an axial flange of said rim, the second named annular portion having pressed therefrom a plurality of radially outwardly projecting resilient tabs spaced around its periphery and extending in a generally axially outward direction for resilient engagement with an axial flange of the rim, said tabs having edges turned generally toward and bitingly engageable with said rim flange.

15. A wheel cover for disposition over a wheel and inwardly of the wheel rim, comprising an annulus, the radially inner periphery of said annulus adapted to be placed in engagement with central portions of said wheel, said annulus having a plurality of resilient tabs equally spaced around its periphery and adapted to be pressed into engagement with the rim for aiding in cushioning the wheel cover on the rim; said tabs being twisted so as to permit edges to be in biting engagement with said rim thereby preventing rotation of the cover relative to the wheel and rim.

16. In a wheel assembly including a wheel having wheel cover retaining means in its central portion and a drop center rim having an intermediate flange, a circular ornamental disk, the radially inner periphery of said disk extending toward said wheel and into engagement with said retaining means, said disk having a portion adapted to telescope within said intermediate flange and a plurality of tabs deflected to project radially outwardly from said portion into resilient engagement with said intermediate flange, said tabs having their distal ends extending generally axially outwardly and said tabs being twisted on their axes so that the radially outermost edges will bite into said intermediate flange and prevent rotation of said cover relative to the rim.

17. As an article of manufacture, a wheel cover comprising a circular disk formed from sheet metal, a radially outer portion of the disk having a plurality of tabs cut therein so that the distal ends point toward a portion of the disk, said tabs being deflected radially outwardly and being twisted about their axes to present corner end portions for biting engagement with a rim flange.

References Cited in the file of this patent

UNITED STATES PATENTS

| 1,730,490 | Winchester | Oct. 8, 1929 |
| 2,119,991 | Hunt | June 7, 1938 |
| 2,368,238 | Lyon | Jan. 30, 1945 |
| 2,785,777 | Horn | Mar. 19, 1957 |

FOREIGN PATENTS

| 682,948 | France | Feb. 24, 1930 |

OTHER REFERENCES

Publication: "Chrysler Brake Service," vol. 21, No. 5, page 14, May 1951.